Feb. 13, 1940.  W. SPERRY  2,190,049
BELT AND TAPE CUTTER
Filed June 27, 1938
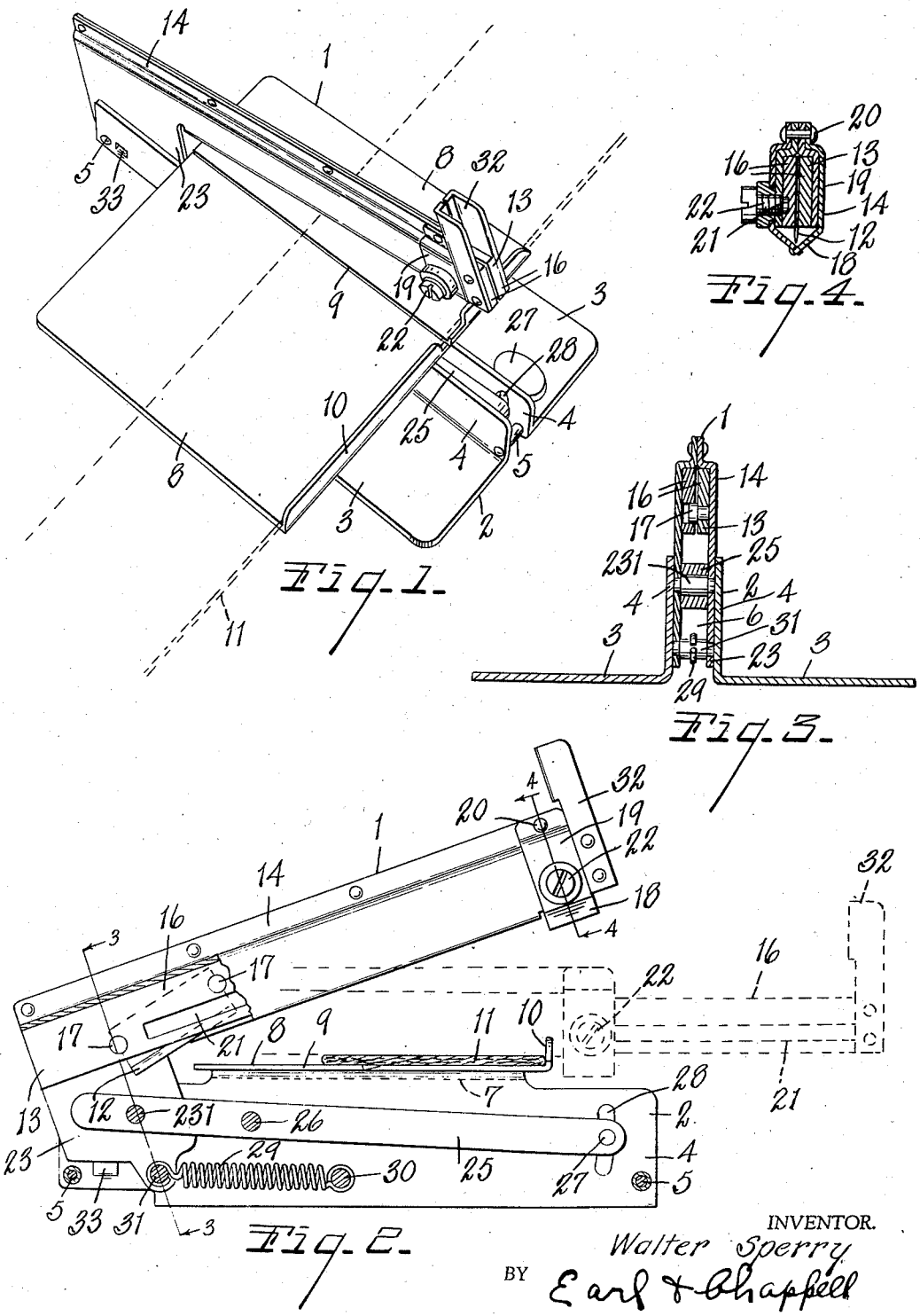
INVENTOR.
Walter Sperry
BY Earl & Chappell
ATTORNEYS Patented Feb. 13, 1940

2,190,049

UNITED STATES PATENT OFFICE 2,190,049

BELT AND TAPE CUTTER

Walter Sperry, Grand Rapids, Mich., assignor to Clipper Belt Lacer Company, Grand Rapids, Mich., a corporation of Michigan Application June 27, 1938, Serial No. 216,015

13 Claims. (Cl. 164—73)

This invention relates to improvements in belt and tape cutters.

The main objects of this invention are:

First, to provide a device for cutting belts and tapes regardless of the thickness thereof.

Second, to provide a device having a work supporting table and a cutter bar reciprocable transversely of the table with means for adjusting the relation of the cutter bar to work supported on the table whereby to accommodate work of varying thickness with equal facility.

Third, to provide a device having a work table for supporting a belt or tape to be severed and a cutter bar having an adjustable support to vary the relative position of the work and bar.

Objects relating to details and economies of the invention will appear from the description to follow. The invention is defined and pointed out in the claims.

A preferred embodiment of the invention is illustrated in the accompanying drawing, in which:

Fig. 1 is a top perspective view of a device embodying the invention.

Fig. 2 is a view in side elevation partially broken away and in section illustrating details of the construction of the device, parts of which are indicated in dotted lines in a position occupied thereby during the operation of the device.

Fig. 3 is a view in section on line 3—3 of Fig. 2, and

Fig. 4 is a view in section on line 4—4 of Fig. 2.

The present invention relates to belt or tape cutting devices of the type illustrated in the patent to James K. Diamond, No. 2,117,153, dated May 10, 1938, wherein a work supporting and positioning table is provided having a slot therein to receive a cutter blade for actuation of the latter transversely of and through work supported on the table. In the said patent, the blade is carried by a cutter bar slidable in a holder which is pivoted to the standard of the device.

In the cutting of woven belts and tapes, it is highly desirable that they be clamped upon the work table throughout the width thereof, and I have found that in the cutting of belts of substantial variation in thickness it is a matter of great advantage to support the combined cutter bar and work clamp or holder in an effective manner so that it may be adjusted into parallelism with a table and in clamping relation to work of substantially varying thicknesses. This I have accomplished in the embodiment of my invention illustrated in the accompanying drawing.

Referring to the drawing, the reference numeral 1 in general indicates the device of the invention which comprises a suitable base or standard 2 here consisting of a pair of oppositely disposed angular members 3, the vertical webs 4 of which are secured together in spaced relation by suitable rivets and spacers generally designated 5. This provides a transverse chamber or space 6 within which certain elements to be described are disposed.

The base members are provided with flanges 7 to which the table members 8 are suitably secured. These table members are slightly spaced relative to one another to provide a slot 9 extending transversely of the table and directly over the chamber 6 of the base. This slot 9 is adapted to receive the cutter blade during the cutting stroke thereof as will be described.

The table elements 8 are provided with work gauging or positioning fences 10 against which the work 11 rests, the work illustrated being a belt or tape which is conventionally illustrated in Fig. 1.

The cutter blade 12 is mounted on the rear end of the cutter bar 13 which is slidable longitudinally in the combined cutter bar and work holder member 14. This is preferably in the form of a channel or housing quite similar to that illustrated and described in the aforesaid patent to Diamond and therefore is not described with further detail herein.

The cutter bar 13 consists of a pair of bar-like members 16 between which the blade 12 is inserted, the member 16 being provided with registering apertures and lugs or studs 17 which engage corresponding recesses in the blade to support the latter in a rearwardly inclined position with the edge of the blade extending downwardly from the cutter bar and below the lower edge of the cutter bar holder and clamp member 14—see Fig. 2.

The member 14 has at its free end a downwardly extending guard 18 constituted by the bracket 19 which is riveted to the member 14 at 20 and which overhangs the work rest or fence 10 when the combined cutter bar holder and work clamp is in operative position relative to the table as shown by dotted lines in Fig. 2. The fence 10 is cut away adjacent the slot to receive the member 14 when it is in work clamping position.

One of the cutter bar members 16 is provided with a longitudinal groove 21 which cooperates with the end of a stop 22 threaded into the guard 18. This is also substantially as illustrated in the Diamond patent.

The cutter bar holder and work clamp is provided at its rear end with a pair of downwardly projecting pivot ears or extensions 23 which extend into the space or chamber of the base. These ears are pivotally mounted at 23I on the longitudinally disposed lever-like supporting bar 25 which is pivoted at 26 for vertical swinging movement in the base 6. This supporting bar is adjustably secured in its adjusted angular position by means of the screw 27 extending through the arcuate slot 28 in one of the webs 4 and into engagement with the end of the supporting bar. When this thumb screw is released, the supporting bar is free to swing up and down and thus raise or lower the pivot for the combined cutter bar holder and clamping member I4. This permits the work holder to be swung down into clamping position with the work as indicated by dotted lines in Fig. 2 and into parallel relation with the table so that it clamps the work throughout the width thereof, the pivot being raised as the thickness of the work increases and vice versa.

When it is desired to adjust the machine to a particular piece of work, the thumb nut or screw is loosened, the member I4 swung down into clamping position and in parallel relation with the table and the thumb screw tightened with the work holder in its work clamping position. This adjusts it so that it effectively clamps any work of a thickness for which it is adjusted or approximating that thickness.

The spring 29 is provided for automatically urging the member I4 to its retracted position. This spring is secured at 2I to the base member and at 3I to the lower ends of the ears 23. A stop 33 is provided for the member I4.

The cutter bar is provided with an upwardly projecting finger piece 32 which is adapted to be grasped so that a pull thereon first brings the member I4 into clamping engagement with the work and then actuates the cutter bar.

Structures embodying my improvements are highly effective for the cutting of belts and well adapted for the cutting of woven fabric belts cleanly which is important as any projecting strands are likely to become entangled in machinery and thus cause raveling and other difficulties.

My device is extremely simple in its parts and yet provides an effective means for positioning the cutter bar holder and work clamp for the best possible engagement of the same with the work. Moreover, in adjusted position, a rigid support is provided for holder and work clamp, and the adjustment whereby various relations of the holder and clamp to the table are effected is easy and quickly accomplished.

Having thus described my invention, what I claim as new and desire to secure by Letters Patent, is:

1. A belt and tape cutting device comprising a standard, a work table on said standard having a slot therein, a cutter blade reciprocable in said slot transversely of the table, means for mounting said blade comprising a cutter bar on which the blade is mounted, a holder slidably enclosing the bar and having means for guiding said bar for longitudinal movement transversely of the work, said holder being adapted to clampingly engage the work during the cutting operation, and means for adjustably mounting said combined holder and clamp comprising a lever medially pivoted on said standard beneath said work table and slot therein and pivoted at one end to said combined holder and clamp, and means for adjusting and securing said lever to said standard in different angular positions whereby to alter the relation of the combined holder and clamp to the work table.

2. A belt and tape cutting device comprising a standard, a work table on said standard, a cutter blade reciprocable transversely of the table, means for guiding said blade for longitudinal movement transversely of the work, said means being adapted to clampingly engage the work during the cutting operation, and means for adjustably mounting said combined guide means and clamp comprising a lever medially pivoted on said standard beneath said work table and pivoted at one end to said combined means and clamp, and means for adjusting and securing said lever to said standard in different angular positions whereby to alter the relation of the combined means and clamp to the work table.

3. A belt and tape cutting device comprising a work table, a standard for supporting said table, a cutter blade reciprocable transversely of the table, a guide for said blade, and means for adjusting said guide relative to the table to maintain the path of said blade in parallelism with the work supporting surface of the table comprising a supporting bar pivoted to the standard and to the guide, and means for clamping the supporting bar in adjusted angular position.

4. A belt and tape cutting device comprising a work support, a cutter blade reciprocable transversely of the support, a guide for said blade, and means for adjustably pivoting said guide relative to the support to enable the guide to be swung into clamping engagement with work on the support and to maintain the path of said blade in parallelism with the surface of the support comprising a supporting bar pivoted to the support and to the guide, and means for securing the supporting bar in adjusted angular position.

5. A cutting device for belts, tapes and the like comprising a work table, a cutter, a combined cutter guide and work clamp, said combined guide and clamp being pivoted relative to the table and work supported thereon to enable the guide and clamp to be swung into operative position relative to the work to clamp the same, said cutter being reciprocable transversely of the work in said guide, and means for pivotally mounting said guide and clamp relative to the table, said last named means including means pivoted relative to the table for adjusting the pivot point of the guide and clamp.

6. A cutting device for belts, tapes and the like comprising a work table having a slot therein, a cutter reciprocable transversely of the table in said slot, a combined cutter guide and work clamp, said combined guide and clamp being pivoted relative to the table and work supported thereon to enable the guide and clamp to be swung into operative position relative to the work to clamp the same, and means for pivotally mounting said guide and clamp relative to the table whereby to permit adjustment of the former to assure that the path of the cutter is parallel to the surface of the table, said last named means including means pivoted relative to the table for adjusting the pivot point of the guide and clamp.

7. The combination with a work table, of a supporting bar pivotally mounted below and transversely of said table, a combined cutter bar and work holder member pivotally mounted on the rear end of said supporting bar so that when the supporting bar is free to swing on its pivot the holder member may be swung into work clamping position upon work of different thicknesses and into parallel relation to the plane of the table, means for clamping the front end of said supporting bar in its adjusted positions, and a cutter mounted in said holder member for reciprocatory movement longitudinally thereof.

8. A belt and tape cutting device comprising a work table having a transverse slot therein, a cutter reciprocable in said slot transversely of the table, a holder member in which said cutter is reciprocatingly mounted adapted to clamp the work during the cutting operation, means for adjustably mounting said holder member comprising a pivoted supporting bar on which said supporting member is pivoted, and means for securing said supporting bar in its adjusted positions.

9. The combination with a work table, of a supporting member adjustably mounted at the rear of said table, a combined cutter bar and work holder member pivotally mounted on said supporting member so that when the supporting member is freed from its securing means the holder member may be swung into work clamping position upon work of different thicknesses in parallel relation to the plane of the table, means including an actuating member disposed at the front of the table for securing said supporting member in its adjusted positions, and a cutter mounted on said holder member for reciprocatory movement longitudinally thereof.

10. The combination with a work table, of a combined cutter and work holder member, a supporting bar pivotally mounted below said work table, said holder member being pivotally mounted on said supporting bar, means for securing said supporting bar in its adjusted angular positions, and a cutter mounted on said holder member for reciprocating movement longitudinally thereof.

11. The combination with a work table, of a combined cutter and work holder member, a pivotally mounted supporting member, said holder member being pivotally mounted on said supporting member, means for securing said supporting member in its adjusted angular positions, and a cutter mounted on said holder member for reciprocating movement longitudinally thereof.

12. The combination with a work table, of a combined cutter and work holder member, a supporting member on which said holder member is pivotally mounted adjacent the rear of the table, said supporting member being mounted for adjustment relative to the plane of the table, means actuated adjacent the front of the table for securing said supporting member in its adjusted positions, and a cutter mounted on said holder member for sliding movement longitudinally thereof.

13. The combination with a work table, of a vertically adjustable support member, a work holder member pivotally mounted on said support member adjacent the rear of the table to be swung into work clamping position upon work of different thickness, means disposed adjacent the front of the table for securing said support member in its adjusted positions, and a cutter slidably mounted on said holder member.

WALTER SPERRY.